United States Patent [19]
Adelman et al.

[11] Patent Number: 5,105,678
[45] Date of Patent: Apr. 21, 1992

[54] BALANCED DUAL BALL BEARING CONTROL

[75] Inventors: Frank F. Adelman, Bensalem; Joseph Sosnoski, Norristown; Rodney L. Alderfer, Harlevsville, all of Pa.

[73] Assignee: Teleflex Incorporated, Limerick, Pa.

[21] Appl. No.: 715,988

[22] Filed: Jun. 17, 1991

[51] Int. Cl.$^5$ .............................................. F16C 1/10
[52] U.S. Cl. ................... 74/501.3; 74/501.4; 74/501.6
[58] Field of Search ............. 74/502.3, 502.4, 502.5, 74/502.6, 500.5, 501.5 R

[56] References Cited

U.S. PATENT DOCUMENTS

| | | | |
|---|---|---|---|
| 3,505,900 | 4/1970 | Stahr | 74/502.4 |
| 3,528,312 | 9/1970 | Nielsen | 74/502.4 X |
| 4,334,438 | 6/1982 | Mochida | 74/502.4 |
| 4,838,820 | 6/1989 | Boda et al. | 74/502.4 X |
| 4,887,929 | 12/1989 | Hale | 74/502.6 X |
| 4,951,525 | 8/1990 | Shiota et al. | 74/502.6 X |
| 5,009,122 | 4/1991 | Chaczyk et al. | 74/502.6 |

FOREIGN PATENT DOCUMENTS

| | | | |
|---|---|---|---|
| 185581 | 6/1986 | European Pat. Off. | 74/502.3 |
| 1525315 | 9/1969 | Fed. Rep. of Germany | 74/502.5 |
| 2585418 | 1/1987 | France | 74/502.3 |

*Primary Examiner*—Dwight Diehl
*Attorney, Agent, or Firm*—Reising, Ethington, Barnard, Perry & Milton

[57] ABSTRACT

A motion transmitting remote control cable assembly (10) of the type for transmitting motion in a curved path comprises a first casing (12), first (14) and second (16) terminal blocks and a first core element (18) extending through the first casing (12) between the first and second terminal blocks (14,16). The assembly also includes a second casing (20) and a second core element (22) extending through the second casing (20) and between the first and second terminal blocks (14,16). The assembly (10) is characterized by means (24) for placing one of the core elements (18,22) in tension and placing the other core element (18,22) in compression while the one remains in tension for reducing backlash in the trnasmission of forces between the first and second terminal blocks (14,16).

25 Claims, 1 Drawing Sheet

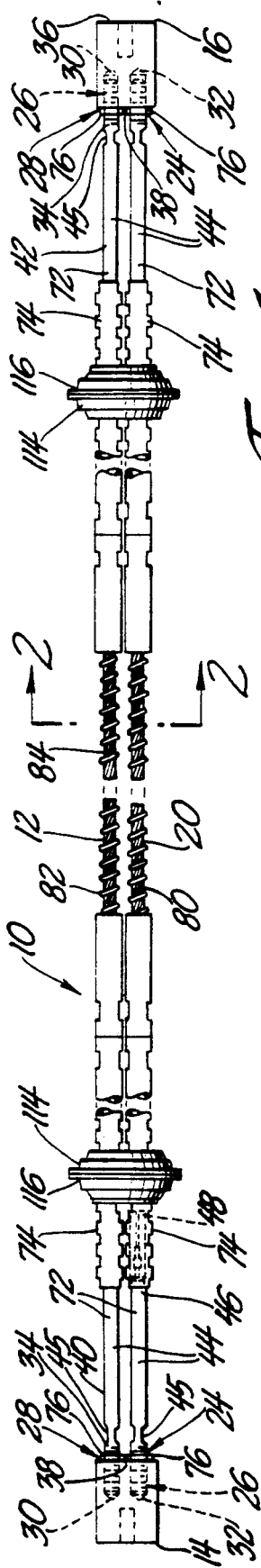
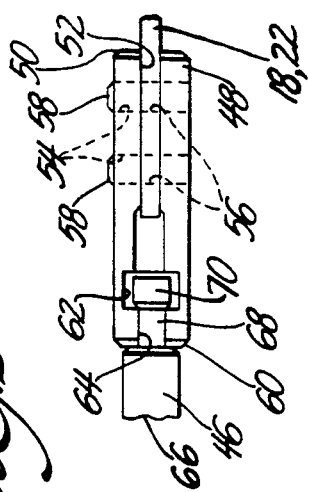
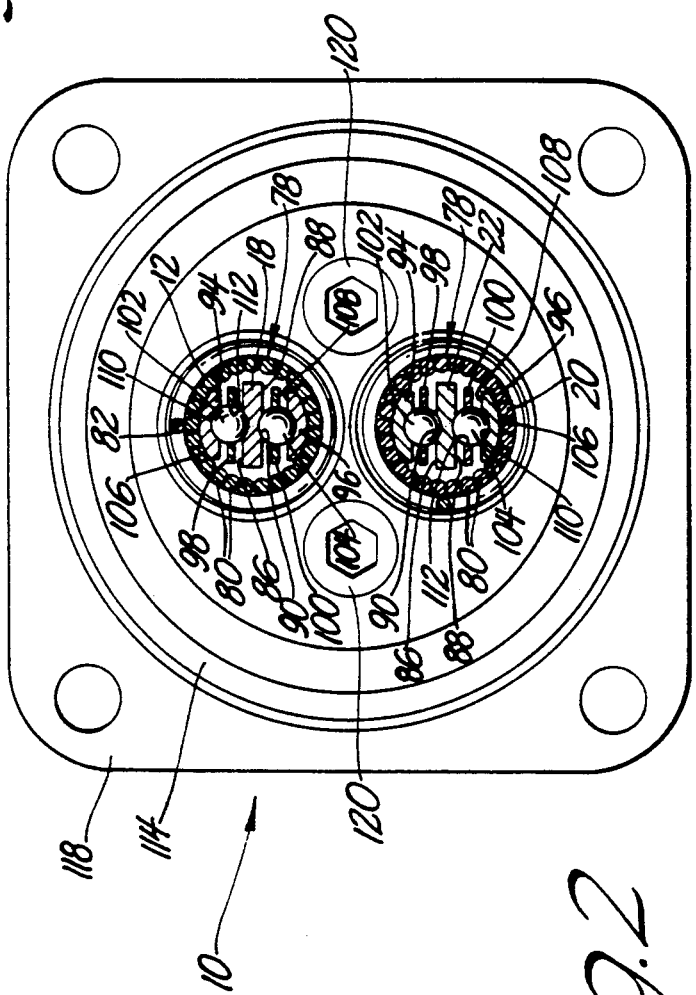

BALANCED DUAL BALL BEARING CONTROL

TECHNICAL FIELD

The subject assembly relates to motion transmitting remote control cable assemblies of the type for transmitting motion in a curved path by a flexible core element slidably supported in a casing.

BACKGROUND OF THE INVENTION

Motion transmitting remote control cable assemblies of the type for transmitting motion in a curved path are used to transmit forces from a remote control device to an element to be controlled. The path through which the forces are to be transmitted is often long and sometimes curved. Under such conditions, backlash problems may arise with the standard remote control cable assembly consisting of a single core element in a single casing.

Backlash is most troublesome when a single core element disposed in a casing must transmit push-pull forces from one end of the core element to the other across a curved path. In order for the core element to transmit a pulling force, the core element must be in tension. If the core element is not in tension at the moment the pulling force is applied, the core element must travel into a tension disposition. This travel time represents a loss of responsiveness between the force initiated at one end and the force received at the other end of the core element.

The same phenomenon is observable when a pushing force is initiated at one end of the core element. If the core element is not in compression at the moment the force is applied, the core element must travel to a compressed disposition before the pushing force is transmitted. Again, this travel time represents a loss of responsiveness in the motion transmitting assembly.

SUMMARY OF THE INVENTION

A motion transmitting remote control cable assembly of the type for transmitting linear motion in a curved path comprises a first casing, first and second terminal blocks and a first core element extending through the first casing and between the first and second terminal blocks with a predetermined effective length for transmitting motion between the blocks. The assembly further includes a second casing and a second core element extending through the second casing and between the first and second blocks with a predetermined effective length for transmitting motion between the blocks along with the first core element. The assembly is characterized by including means for placing the first core element in tension and placing the second core element in compression while the first remains in tension for reducing backlash when transmitting linear motion between the first and second terminal blocks.

Maintaining one core element in tension while the other is in compression allows for forces to be transmitted in push pull cable assemblies with minimum backlash. When a pulling force is applied by the control device, the core element in tension responds quickly in transmitting the motion. When a pushing force is applied by the control device, the core element in compression responds quickly in transmitting the motion.

Also disclosed is a method for the remote control transmitting of motion in a curved path including the steps of placing first and second core elements in parallel, interconnecting the two core elements, placing the first core element in tension and placing the second core element in compression while the first core element remains in tension.

FIGURES IN THE DRAWINGS

Other advantages of the present invention will be readily appreciated as the same becomes better understood by reference to the following detailed description when considered in connection with the accompanying drawings wherein:

FIG. 1 is a side view of the subject assembly;

FIG. 2 is a cross-sectional view of the subject assembly taken along line 2—2 of FIG. 1; and FIG. 3 is a fragmentary view of the terminal member shown in phantom in FIG. 1.

DESCRIPTION OF THE PREFERRED EMBODIMENT

A motion transmitting remote control cable assembly generally shown at 10 of the type for transmitting linear motion in a curved path comprises a first casing or conduit 12, first 14 and second 16 terminal blocks, and a first core element 18 extending through the first casing 12 and between the first and second terminal blocks 14,16 with a predetermined effective length for transmitting motion between the blocks. The assembly 10 further includes a second casing or conduit 20 and a second core element 22 extending through the second casing 20 and between the first and second blocks 14,16 with a predetermined effective length for transmitting motion between the blocks along with the first core element 18. The assembly 10 is characterized by including means generally indicated at 24 for placing one of the core elements 18,22 in tension and placing the other core element 18,22 in compression while the one core element 18,22 remains in tension for reducing backlash when transmitting linear motion between first and second terminal blocks 14,16.

The means 24 for placing one of the core elements 18,22 in tension and simultaneously placing the other core element 18,22 in compression includes adjustment means generally indicated at 26 between each of the terminal blocks 14,16 and each of the core elements 18,22 for adjusting the effective length of at least one of the core elements 18,22 so that one of the core elements 18,22 is placed in tension while the other 18,22 is placed in compression.

The means 24 disclosed above further includes locking means generally indicated at 28 disposed on the adjustment means 26 for fixing the lengths of the core elements 18,22 after the effective lengths are adjusted.

The assembly 10 could work by having adjustment only between one end 40, 42 of one of the core elements 18, 22 and one of the terminal blocks 14, 16. The preferred embodiment includes adjustment between both ends 40, 42 of both core elements 18, 22 and both terminal blocks 14, 16. The adjustment means 26 includes the terminal blocks 14,16 and the terminals 44 disposed on the core elements 18,22. The first and second terminal blocks 14,16 have first 30 and second 32 holes tapped for receiving the helical threads 34 on the first and second core elements 18,22, respectively. Each terminal block 14,16, includes an outside face 36 and an oppositely disposed inside face 38 in which said first and second holes 30,32 are tapped. The holes 30,32 include threads which mate with threads on the core elements 18,22. The first terminal block 14 connects with the control device (not shown), or a core element (not shown) extending therefrom, at its outside face. The second terminal block 16 connects to the element to be controlled (not shown), or a core element (not shown) extending therefrom, at its outside face 36.

The core elements 18,22 include helical threads 34 on first 40 and second 42 ends for threading into the terminal blocks 14,16. Each of the first and second core elements 18,22 includes rotatable terminals 44 disposed on the first and second ends 40,42. These rotatable terminals 44 are rotatable with respect to each of the core elements 18,22. The rotatable terminals 44 have the helical threads 34 disposed therearound and are for threading the first and second ends 40,42 of each of the core elements 18,22 into and out of engagement with the first and second terminal blocks 14,16 without need for rotating the core elements 18,22 with respect to the terminal blocks 14,16. The terminals 44 include wrench flats 45 formed in the ends of the terminals adjacent the threads 34 for receiving a wrench which can be used to rotate the terminals.

Each rotatable terminal 44 includes a male member 46 and a female member 48. In one embodiment the female member 48 includes a first end 50 having a connecting slot 52 for receiving the core element 18,22. The female member 48 includes two pin holes 54 drilled through the first end 50 and transverse to the slot 52. The pin holes 54 align with inside and outside holes 56 formed in the end of the core element 18,22. Pins 58 are disposed through the holes 54,56 for retaining the female member 48 to the core element 18,22. The female member 48 further includes a second end 60 having a notch or cavity 62 and a neck slot 64 for engaging with the male member 46. The cavity 62 is wider than the neck slot 64.

The male member 46 has a first end 66 which includes a cylindrical neck portion 68 having a cylindrical enlargement or head 70 thereon for radially disposing in the cavity 62 in the female member 48. The neck portion 68 radially fits into the neck slot 64 in the female member 48 when the enlargement 70 fits in the cavity 62. When the male member 46 radially engages the female member 48, axial movement between the male and female members 46,48 is prevented since the enlargement 70 cannot be pulled through the neck slot 64. However, rotational movement is allowed since the cylindrical enlargement 70 on the male member 46 can rotate while it fits in the cavity 62. The male member 46 also has a second end 72 which includes helical threads 34 on its outer surface which rotatably engage with one of the tapped holes 30,32 in the terminal block 14,16. In this embodiment the female member 48 does not rotate with respect to the core element 18,22, but the male member 46 can rotate with respect to the female member 48 and the core element 18,22. This is because the neck 68 and enlargement 70, being cylindrical, freely rotate within the neck slot 64 and cavity 62, respectively, in the female member 48.

In an alternative embodiment the male member 46 includes a first end 66 having a connecting slot 52 for receiving the core element 18,22. Two pin holes 54 are formed in the male member 46 transverse to the slot 52. These pin holes 54 should align with the holes 56 formed in the core element 18,22 when the core element is placed in the connecting slot 52. Two pins 58 may be placed through the holes 54,56 in order to retain the core element 18,22 to the male member 46. The second end 72 of the male member includes the neck 68 and enlargement 70 described above.

The female member 48 in this second embodiment has a first end 50 having the neck slot 64 and cavity 62 described above. The male member 46 engages with the female member 48 in the same way as described above in the first embodiment. The female member 48 has a second end 60 which includes helical threads 34 therearound for engaging with the threads tapped in the terminal blocks 14,16. In the second embodiment, the male member 46 is fixed with respect to the core element 18,22, and the female member 48 is rotatable with respect to the male member 46 and the core element.

Both embodiments include a tubular sleeve 74 which slideably extends along the core element 18,22 and over the engaged male and female members 46,48 to protect the members and to prevent radial movement of the male member out of engagement with the female member. All of the elements of the terminal, including the male and female members 46,48 and the sleeve 74 are made from metal, although other suitable materials may be used.

In both embodiments, the ends 40,42 of the core elements 18,22 may be threadedly secured to the terminal blocks 14,16 without rotating the core elements.

The locking means 28 includes lock nuts 76. The lock nuts 76 are disposed on the threads 34 of the terminals 44 for locking the terminals against rotational movement. Once the terminals 44 are threaded into the terminal blocks 14,16 the desired amount or degree, the lock nuts 76 on the terminals are threaded along the terminals until they tightly abut the terminal blocks 14,16. This then locks the terminals 44 against further rotation until the nuts 76 are released from abutting the blocks 14,16.

Each cable includes a casing 12,20, a core element 18,22 and a ball bearing assembly generally indicated at 78 for providing smooth sliding movement of the core element within the casing.

Each casing 12,20 includes a plurality of long lay strands 80 wound helically, and a single strand 82 wound helically around the plurality 80. All of the strands 80,82 are made from stainless steel. A coating 84 may be included over each of these casings 12,20 to protect the outer surface of the casing from wear. The coating 84 is typically a shrinkable polyolefin sleeve.

The core element 18,22 is a flat length of stainless steel having a generally rectangular cross section. The core element 18,22 includes oppositely disposed first and second sides 86,88 each including a track depression 90 in the surface of each side. The tracks 90 contact and retain the ball bearings 102,104 when the core element 18,22 moves axially with respect to the casing 12,20. Each core element 18,22 includes at its first and second ends 40,42 inside and outside holes 56 transverse to the first and second sides 86,88 of the core element. The inside and outside holes 56 correspond to the pin holes 54 formed in whichever terminal member, male 46 or female 48, the core element 18,22 is to engage with.

The ball bearing assembly 78 includes first and second stainless steel races 94,96, first and second stainless steel ball bearing cages 98,100, and first and second sets of stainless steel ball bearings 102,104. The first and second races 94,96 are disposed adjacent to the casing 12,20 and opposite to the first and second sides 86,88, respectively, of the core element 16,18. Each race 94,96 is generally bar shaped, having a casing surface 106 conforming in shape to the inner surface of the casing 12,20, and a bearing surface 108 having a bearing track 110 for contacting and retaining the ball bearings 102,104.

Each cable further includes first and second stainless steel bearing cages 98,100 for retaining the ball bearings 102,104 in spaced apart positions when the core element 18,22 moves within the casing 12,20. Each cage 98,100 is a flat strip having rectangular cross section, and runs the length of the casing 12,20 parallel to the core element 18,22. Each cage 98,100 includes circular holes 112 transverse to its length and spaced apart from one another for retaining the ball bearings 102,104. The first cage 98 is disposed between the first side 86 of the core element 18,22 and the first race 94. The first cage 102 retains the first set of ball bearings 102 between the first race 94 and the first side 86 of the core element 18,22. The second cage 100 is disposed between the second side 88 of the core element 18,22 and the second race 94. The second cage 100 retains the second set of ball bearings 104 between the second race 96 and the second side 88 of the core element 18,22.

The assembly includes a swivel bulk head mounting 114 disposed in a hole 116 in a bulkhead 118 for supporting the casings 12,20 and for allowing swivelling of the casings as the casings pass through the hole 116. Clamping screws 120 are included for clamping the swivel bulk head mounting 114 to the bulkhead 118.

In installing the assembly 10, the installer will want to thread each of the terminals 44 into the terminal blocks 14,16 in such a manner as to place one of the core elements 18,22 into tension and the other into compression. The lock nuts 76 may then be threaded along the terminals 44 into abutting engagement with the terminal blocks 14,16 to prevent any further rotational movement of the terminals 44.

In operation, a push-pull force is transmitted from the control device (not shown) to the first terminal block 14. This is achieved typically by a single core element (not shown) leading from the control device to the first terminal block 14 and attaching to the terminal block at its outer face 36. The force transmitted to the first block 14 is transmitted to the second block 16 by the first and second core elements 18,22. If a pushing force is transmitted, the core element 18,22 in compression will transmit the force with responsiveness and little backlash. If a pulling force is transmitted, the core element in tension 18,22 will transmit the force with responsiveness and little backlash. The second terminal block 16 typically has a single core element (not shown) attached to its outer face 36. This single core element finally transmits the push-pull force to the element to be controlled (not shown). This new dual core element assembly 10 thus transmits pushing and pulling forces between the control device and the element to be controlled with less backlash and more responsiveness than a single core element system would.

The method is disclosed for the remote control transmitting of motion in a curved path including the steps of placing first and second core elements 18,22 in parallel, interconnecting the core elements, placing the first core element 18 in tension and placing the second core element 22 in compression while the first core element 18 remains in tension. The core elements are interconnected by placing the terminal blocks 14, 16 one at either end 40, 42. The method also includes the steps of adjusting the effective lengths of the core elements 18,22, placing one of the core elements 18,22 in compression and simultaneously placing the other of the core elements 18,22 in tension. The method further includes the steps of locking the core elements 18,22 with respect to the blocks 14,16 and retaining one of the core elements in tension and simultaneously retaining the other in compression. The method also includes the step of threading the first and second ends 40,42 of each of the core elements 18,22 into the first and second terminal blocks 14,16. This threading adjusts the effective lengths of each of the core elements 18,22, and thus the tension or compression of each of the core elements. The locking nuts 76 threaded on the terminals 44 thread into abutment with the terminal blocks 14,16 and thus lock the terminals against any further rotation. This locks the core elements 18,22 in whatever tension or compression state they are adjusted to be in.

The invention has been described in an illustrative manner, and it is to be understood that the terminology which has been used is intended to be in the nature of words of description rather than limitation.

Obviously, many modifications and variations of the present invention are possible in light of the above teachings. It is therefore to be understood that within the scope of the appended claims wherein reference numerals are merely for convenience and are not to be in any way limiting, the invention may be practiced otherwise than as specifically described.

What is claimed:

1. A motion transmitting remote control cable assembly (10) of the type for transmitting linear motion in a curved path comprising:
   a first casing (12);
   first (14) and second (16) terminal blocks;
   and a first core element (18) extending through said first casing (12) and between said first and second terminal blocks (14,16) with a predetermined effective length for transmitting motion between said blocks;
   a second casing (20);
   a second core element (22) extending through said second casing (22) and between said first and second blocks (14,16) with a predetermined length for transmitting motion between said blocks along with said first core element (18);
   characterized by including dual enforcement means (24) for placing said first core element (18) in tension and placing said second core element (22) in compression while said first core element remains in tension for reducing backlash when transmitting linear motion between said first and second terminal blocks (14,16).

2. An assembly (10) as set forth in claim 1 further characterized by said dual enforcement means (24) including adjustment means between one of said terminal blocks (14,16) and one of said core elements (18,22) for adjusting said effective length of said one of said core elements so that one of said core elements is placed in tension while the other is placed in compression.

3. An assembly as set forth in claim 2 further characterized by said dual enforcement means (24) including locking means (28) for fixing said effective length of said one of said core elements (18,22) after said length is adjusted.

4. An assembly (10) as set forth in claim 3 further characterized by said dual enforcement means (24) including adjustment means (26) between each of said terminal blocks (14,16) and each of said core elements (18,22) for adjusting said effective length of at least one of said core elements so that one of said core elements (18,22) is placed in tension while the other is placed in compression.

5. An assembly (10) as set forth in claim 4 further characterized by said core elements (18,22) including first and second ends (40,42), and helical threads (34) disposed on said first and second ends for threading into said terminal blocks (14,16).

6. An assembly (10) as set forth in claim 5 further characterized by said terminal blocks (14,16) being tapped for receiving said helical threads (34) on said core elements (18,22).

7. An assembly (10) as set forth in claim 6 further characterized by each of said first and second core elements (18,22) including rotatable terminals (44) disposed on said first and second ends (40,42) with said helical threads (34) disposed thereon and being rotatable with respect to said core element (18,22) for threading said first and second ends (40,42) of each of said core elements into and out of engagement with said first and second terminal blocks (14,16) without need for rotating said core elements with respect to said terminal blocks.

8. An assembly (10) as set forth in claim 7 further characterized by each of said terminals (44) including a female member (48) and a male member (46) adapted for allowing rotatable engagement therebetween while preventing axial movement therebetween.

9. An assembly (10) as set forth in claim 8 further characterized by said female member (48) being fixed with respect to said core element (18,22).

10. An assembly (10) as set forth in claim 9 further characterized by said male member (46) including threads (34) for threadedly rotating into said terminal blocks (14,16).

11. An assembly (10) as set forth in claim 9 further characterized by said male member (46) being fixed with respect to said core element (18,22).

12. An assembly (10) as set forth in claim 11 further characterized by said female member (48) including threads (34) for threadedly rotating into said terminal blocks (14,16).

13. An assembly (10) as set forth in claim 10 or 12 further characterized by said male and female members (46,48) engaging radially with one another.

14. An assembly (10) as set forth in claim 13 further characterized by including a tubular sleeve (74) slidably covering said male and female members (46,48) while engaged for retaining said male and female members in engagement.

15. An assembly (10) as set forth in claim 14 further characterized by said locking means including lock nuts (76) disposed on said threads (34) of said terminals (44) for threading into abutting engagement with said terminal blocks (14,16) and locking said terminals against rotational movement.

16. An assembly (10) as set forth in claim 15 further characterized by including ball bearings (102,104) between each of said casings (12,20) and its respective core element (18,22) for providing smooth sliding movement of said core element in said casing 17. An assembly (10) as set forth in claim 16 further characterized by said casing (12,20) including a plurality of long lay strands (80) wound helically, and a single strand (82) wound helically around said plurality.

18. An assembly (10) as set forth in claim 17 further characterized by including a coating (84) over each of said casings (12,20) for protecting said casings against wear.

19. An assembly (10) as set forth in claim 18 further characterized by including a swivel bulk head mounting (114) disposed in a hole (116) in a bulk head (118) for supporting said casings (18,22) and for allowing swivelling of said casings as said casings pass through said hole (116).

20. An assembly (10) as set forth in claim 19 further characterized by including clamping means (120) for clamping said swivel bulkhead mounting (114) to said bulk head (118).

21. A method for the remote control transmitting of motion in a curved path including the steps of placing first and second core elements (18,22) in parallel, interconnecting the two core elements (18, 22) placing the first core element (18) in tension and placing the second core element (22) in compression while the first core element remains in tension.

22. A method as set forth in claim 21 further characterized by disposing first and second terminal blocks (14,16) at either end of the core elements (18,22).

23. An assembly as set forth in claim 22 further characterized by locking the core elements (18,22) with respect to terminal blocks (14,16) and retaining one of the core elements (18.22) in tension and retaining the other in compression.

24. A method as set forth in claim 23 including the step of threading threads (34) on first and second ends (40,42) of each of the core elements (18,22) into first and second terminal blocks (14,16), respectively.

25. A method as set forth in claim 24 including the step of threading locking nuts (74) along threads (34) on the core elements (18,22) into abutting engagement with the terminal blocks (14,16) for locking in the effective lengths of the core elements.

* * * * *